United States Patent [19]

Strausser

[11] Patent Number: 4,874,084
[45] Date of Patent: Oct. 17, 1989

[54] COLOR CODING DEVICE, KIT OF COMPONENTS THEREOF, AND METHODS OF CONSTRUCTING AND UTILIZING SAME

[75] Inventor: Richard A. Strausser, Yale, Mich.
[73] Assignee: Hope Sexton, Yale, Mich.
[21] Appl. No.: 164,507
[22] Filed: Mar. 7, 1988
[51] Int. Cl.⁴ .............................................. B65D 85/16
[52] U.S. Cl. ..................... 206/231; 40/316; 40/666; 206/338; 206/459; 211/13
[58] Field of Search ................... 206/338–342, 206/303, 459, 820, 223, 231; 211/13; 248/206.5, 251, 298; 40/309, 316, 666

[56] References Cited

U.S. PATENT DOCUMENTS

| | | | |
|---|---|---|---|
| D. 277,534 | 2/1985 | Warmath | D6/328 |
| 2,954,257 | 9/1960 | Besuch et al. | 248/206.5 |
| 3,023,991 | 3/1962 | Fisher | 248/206.5 |
| 4,234,090 | 11/1980 | Barbieri et al. | 40/316 |
| 4,465,186 | 8/1984 | Meyers | 206/342 |
| 4,581,481 | 4/1986 | Moretti | 206/340 |
| 4,656,767 | 4/1987 | Tarrant | 40/316 |

FOREIGN PATENT DOCUMENTS

| | | | |
|---|---|---|---|
| 0655749 | 1/1938 | Fed. Rep. of Germany | 40/316 |
| 1132955 | 11/1968 | United Kingdom | 40/316 |

*Primary Examiner*—Jimmy G. Foster
*Attorney, Agent, or Firm*—Irving M. Weiner; Joseph P. Carrier; Robert M. Petrik

[57] ABSTRACT

A resilient clip and a kit of components including such kits for marking mating parts with pairs of color-coded clips. In use a mechanic would remove color matching pairs of clips and apply them to mating parts of components, wires, or hoses of an engine being assembled or disassembled.

9 Claims, 1 Drawing Sheet

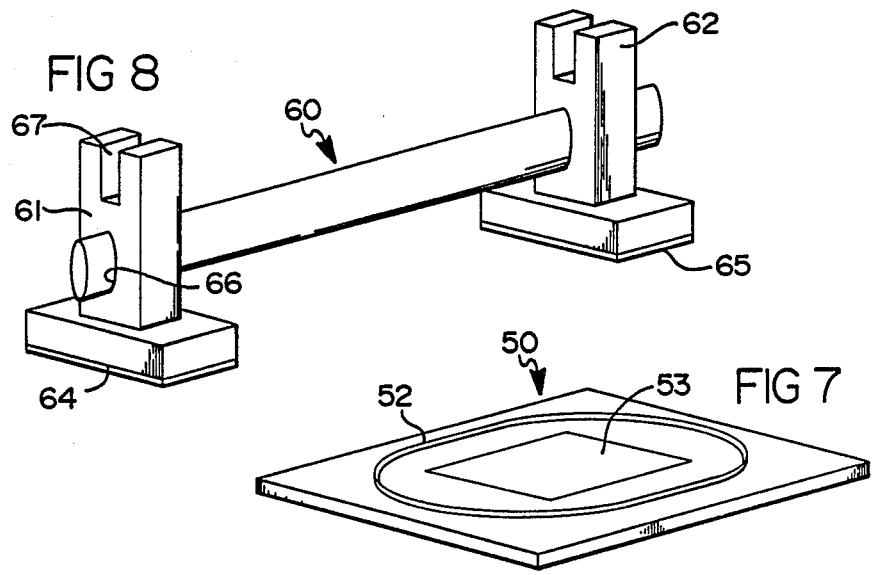
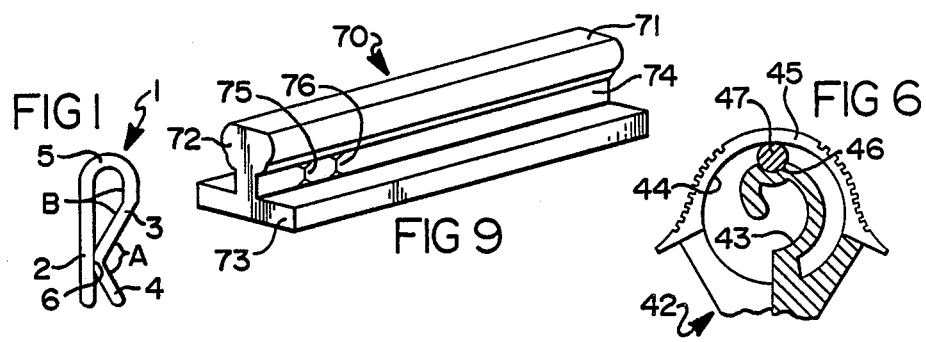
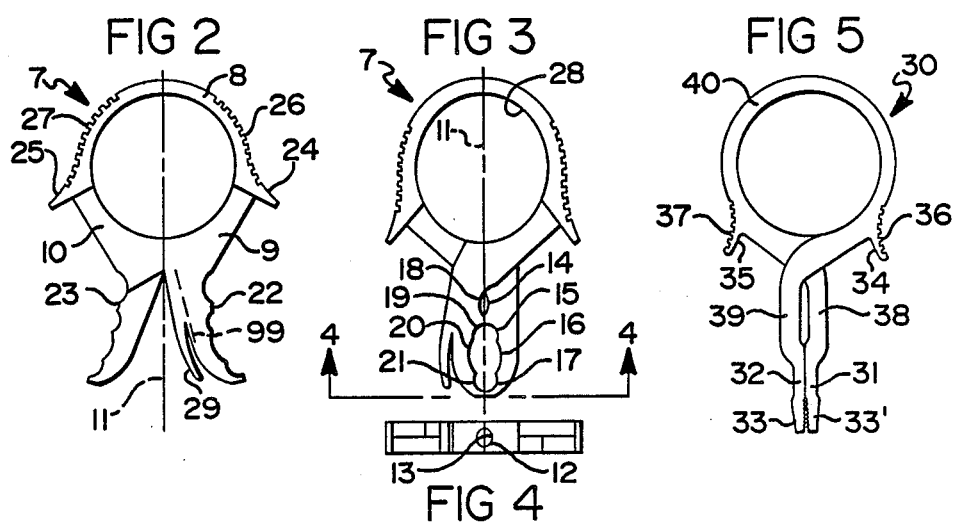

COLOR CODING DEVICE, KIT OF COMPONENTS THEREOF, AND METHODS OF CONSTRUCTING AND UTILIZING SAME

BACKGROUND OF THE INVENTION

1. Field of the Invention

The present invention relates generally to color-coded devices which are used to temporarily mark or identify mating parts, hoses, wires, etc. for assembly and disassembly, and methods of constructing and utilizing same. More particularly, the present invention relates to color-coded resilient clips, and kits of components thereof, to enable the mechanic or do-it-yourselfer to easily identify mating components.

2. Description of the Relevant Art

The relevant art is exemplified by the following two United States patents.

U.S. Pat. No. 4,656,757, issued in 1987 to Tarrant, entitled "CABLE TAG", discloses an identifying device for marking electrical cables. The disclosed cable tag comprises an elongated plastic strip provided with first and second sides including longitudinally spaced Velcro panels which permit the tag to be attached to various sizes of cables. The cable tag also includes identifying indicia on one side of an end portion thereof.

U.S. Des. Pat. No. 277,534, issued 1985 to Warmath, entitled "GARMENT CLIP", discloses a multiple-piece clip which is specifically intended for use with garments.

In an effort to avoid an animadversion of the relevant art devices, suffice it to say that the relevant art fails to satisfy the desiderata of providing devices which can be simply secured to mating parts that may have slick, greasy or oily surfaces, and can be applied by persons having slick, greasy or oily fingers. The present invention avoids the pitfalls, disadvantages and shortcomings of the relevant art, and at the same time satisfies the aforementioned desiderata.

SUMMARY OF THE INVENTION

The present invention provides a kit of components, comprising a plurality of one-piece unitary, integral, resilient clips. Such plurality of clips is provided in color-coded pairs of the clips so that the color of any particular color-coded pair of clips is different than the color of all of the remainder of such color-coded pairs of clips.

The present invention also provides a one-piece unitary, integral resilient clip, which comprises a one-piece unitary, integral, resilient main portion being provided with an integral first arm at a first end thereof and an integral second arm at a second end thereof. The integral first and second arms are disposed on opposite sides of a predetermined plane which substantially perpendicularly bisects such clip. The clip is adapted to be selectively and releasably secured to an external object (such as an engine part, hose, wire, cable, component, etc.) when the integral first and second arms are positioned on substantially opposite sides of such external object so that the clip is held onto the external object by at least one resilient force which acts on the external object in a predetermined direction which is substantially perpendicular to the aforesaid predetermined plane.

The present invention also provides a one-piece unitary, integral, reliant clip, which includes a one-piece unitary, integral resilient main portion that is provided with a first arm at a first end thereof and a second arm at a second end thereof. The first and second arms are configured and dimensioned to be substantially mirror images of each other. The first and second arms are each provided with at least one predetermined object-gripping portion thereon. The clip is adapted to be selectively and releasably secured to an external object when the external object is positioned between and contiguous with at least a portion of such predetermined object-gripping portions of the first and second arms so that the clip is held onto the external object by resilient forces which act on the external object in predetermined directions that are substantially collinear with the radii of curvature of such predetermined object-gripping portions of the first and second arms.

It is an object of the present invention to provide an easy means of temporarily marking parts, hoses, cables and wires for assembly and disassembly.

Another object of the invention is to use easily-attachable color-coded devices, such as a pair of identically colored-clips to mark parts and mating parts on a temporary basis.

A further object is to provide a clip which fits easily over the finger or fingers of the user.

Another object of the invention is to provide a kit of components including a plurality of clips or fasteners which are arranged in color-coded pairs on a supporting tray, rack or backing plate, such that they can be easily and conveniently removed therefrom.

Yet another object of the invention is to provide a novel clip having ears which act as hooks for hanging wires and hoses out of the way of the user.

A further object of the invention is to provide novel clips which can be constructed with various features, textures, shapes and sizes depending upon the particular use intended, but wherein the clips are capable of being securely fastened to parts which have slick, greasy or oily coated surfaces.

Another object of the invention is to provide a novel clip as mentioned above wherein the clip has ears which act as stop members for the opposite arms of the jaw of the clip.

Other objects, advantages and salient features of the present invention will become apparent from the following detailed description, which, when taken in conjunction with the annexed drawings, discloses preferred embodiments of the present invention.

BRIEF DESCRIPTION OF THE DRAWINGS

FIG. 1 illustrates a resilient clip which can be used in accordance with the present invention.

FIG. 2 shows a resilient clip as it would come out of a mold in accordance with a second embodiment of the present invention.

FIG. 3 shows the clip of FIG. 2 after one of the integral arms has been flexed up and brought over to engage the other integral arm.

FIG. 4 depicts a view of the FIG. 3 clip taken along the line 4—4.

FIG. 5 shows another embodiment of the resilient clip according to the present invention.

FIG. 6 is a partial view of a modification of the clips shown in FIGS. 2-5.

FIG. 7 illustrates an isometric view of a tray which forms part of a kit of components according to the present invention.

FIG. 8 is a perspective view of a holder according to the present invention which may form part of a novel kit of components.

FIG. 9 illustrates another embodiment of a novel holder which may form part of a kit of components according to the present invention.

DETAILED DESCRIPTION OF PREFERRED EMBODIMENTS

FIG. 1 shows a one-piece unitary, integral, resilient clip in accordance with 1 embodiment of the present invention. The feature of the invention is to use clips in color mating pairs for identifying parts which a being assembled or disassembled.

The clip 1 has a main portion 5 provided with an integral first arm 2 at a first end thereof, and an integral second arm, comprised of elements 3 and 4, at a second end thereof. The clip 1 is adapted to be selectively and releasably secured to an external object, such as an engine part, cable, hose, wire, etc., when the first and second arms are positioned on substantially opposite sides of the external object so that the clip 1 is held onto the external object by at least one resilient force.

In accordance with the present invention, it has been found preferable to fabricate clip 1 so that angle A falls within the range of 100° to 130°, but preferably at approximately 112°, and that the angle B formed between the element 3 and main portion 5 falls within the range of 130° through 160°, but preferably its approximately 140°.

In a preferred embodiment, the portion between elements 3 and 4 is formed with a flat surface 6 so that when the first and second arms of clip 1 are spread apart the external object is gripped between substantially opposing flat surfaces.

The clips 1 may form part of a novel kit of components wherein there is provided plurality of resilient clips 1 which are arranged in color-coded pairs so that the color of any particular color-coded pair is different than the color of all of the remainder of the color-coded pairs. For example, there may be a red pair of clips 1, and orange pair of clips 1, a greed pair of clips 1, etc. For use, a mechanic in disassembling an engine, for example, may of clips 1, a greed pair of clips 1, etc. For use, a mechanic in disassembling an engine, for example, may separate or disassemble two parts each of which can easily be identified by securing a colored clip 1 on one part and a color clip 1 on its mating part so that both clips have the same color. As an alternative to color-coding the clips 1, or in addition thereto, each pairs of the clips 1 may be identified by being labeled with a specific number. For example, each of the red clips could be labeled number 1, each of the orange clips could be labeled number 2, etc.

FIG. 2 shows a resilient clip 7 according to a preferred embodiment of the present invention. Clip 7 is provided with a one-piece unitary, integral, resilient main portion 8 having an integral first arm 9 at one end thereof and an integral second arm 10 at a second end thereof. The integral arms 9 and 10 are disposed on opposite sides of a predetermined plane 11 which substantially perpendicularly bisects the clip 7.

FIG. 2 shows the clip 7 as it would emerge out of the mold which forms or fabricates it. For most uses of the clip 7, the arm 9 would be flexed up and brought over to engage with the arm 10 onto the configuration of a clip 7 as shown in FIG. 3. However, the clip 7 does have several uses in the configuration shown in FIG. 2.

For example, in the configuration of FIG. 2 the clip 7 could be securely attached to flat components, such as pieces of sheet metal, at the depicted engaging area between back portions of the arms 9 and 10.

Also, in the configuration of FIG. 2, the main part 8 of the clip 7 could be readily slipped around a suspended wire, rod or the like, so that the clip 7 could be used as a suspended clip for holding parts in convenient suspended positions. Particularly, the arms 9 and 10 of the clip 7 could be flexed far enough apart to permit the clip to be readily slipped around the suspended wire at a circular, hollow inner periphery 28 of the main part 8, then the arms 9 and 10 would be manipulated into the configuration of FIG. 3, and finally a part (such as a fan belt) could be gripped by the arms 9 and 10 so as to be suspended from the wire.

The arms 9 and 10 are provided with a plurality of pairs of predetermined object-gripping arcuate portions, such as pairs 14 and 18, 15 and 19, 16 and 20, and 17 and 21, so that the radius of curvature of each arcuate portion of the first arm 9 is different, and the radius of curvature of each arcuate portion of the second arm 10 is different.

Each pair of object-gripping arcuate portions comprises an arcuate portion on the first arm 9 having a predetermined radius of curvature and an arcuate portion on the second arm 10 having a radius of curvature which is substantially equal to the predetermined radius of curvature on the first arm. For example, arcuate portions 15 and 19 would preferably have the same radii of curvature.

The arms 9 and 10 are also provided with portions 22 and 23, respectively, which may very conveniently be used for gripping onto very small wires.

Clip 7 is also provided with a first outstanding ear member 24 between first arm 9 and main portion 8, and a second outstanding ear member 25 between the second arm 10 and the main portion 8. It should be noted that the ears 24 and 25 may serve as hooks for hanging wires and hoses out of the way when gripped onto such external objects, may act as stop members for the opposing jaws or arms of the clip, and may act as stop members for the fingers of the user.

An optional feature of the invention is to have the main portion 8 provided with groves, ribs or roughened portions 26 and 27 along at least a portion of the outer surface of main portion 8. Another feature of the invention is to have the clip 7 fabricated from a chemically-resistant, non-conductive material which has a good resilient memory quality. The groves 26 and 27 improve the users grip on the clip 7 in greasy and oily environments.

In reference to FIGS. 2 and 3, a further feature of the clip 7 is an auxiliary arm 29 on the back portion of arm 9. The auxiliary arm 29 has a groove formed along the length of its inner face, and the back portion of arm 9 has a corresponding grove (indicated at the broken line) formed in its outer surface. The two grooves jointly define a substantially cylindrical opening which can be used for attaching the clip 7 to tubular objects. Optionally, the auxiliary arm 29 may have raised portions (not shown), such as raised bumps, formed along its grooved inner surface to achieve a better grip on tubular objects.

The football-like aperture shown on FIG. 3 between the arcuate portions 14 and 18 can be varied in size depending upon movement of the ears 24 and 25. This creates an intimately variable radius gripping surface for wires and other tubular external members.

Another feature of clip 7 is to provide the hollow, circular inner periphery 28 which permits the clip 7 to be held on the finger of the user or mechanic.

With reference to FIGS. 3 and 4, it should be noted that when the clip 7 is gripped onto a tube or other part from the front end the clip 7 (at configurations 12 and 13) will flex sideways if it is accidentally bumped, and then will flexibly return to its position. This feature enables the clip to be retained on the external tube whereas it might otherwise be accidentally bumped off.

The arms 9 and 10 are each provided in their respective end portions with a partial tubular configuration, which is best shown in FIG. 4 at 12 and 13, to enable the arms 9 and 10 to grip a tubular external object (not shown) having its major elongated axis pointing toward the main portion 8 of clip 7. Such tubular external object may comprise, for example, a cable, wire, a projecting sensor study, etc. This partial tubular configuration is particularly useful for gripping annular grooves on projecting sensor studs. Also, the pin-like or pointed portions of the configuration 12 and 13 are useful for digging into or more securely gripping external objects.

Again, with reference to FIG. 4 the tubular configurations 12 and 13 can be formed by end portions having pin like or point like portions. These pin like portions are formed on opposing pairs on arms 9 and 10. The points or pins can be used for penetrating and gripping holes in censor tabs or the like, as commonly encountered in automotive applications.

FIG. 5 illustrates a resilient clip 30 according to another embodiment of the present invention. Clip 30 is provided with opposing substantially flat portions 31 and 32 on integral arms 38 and 39, respectively. At the end of arms 38 and 39 there is provided substantially opposing groved or toothed portions 32 and 33 for gripping an external object (not shown) there between. The external surfaces of the toothed portions 32 and 33 are tapered such that they become narrower at the front portions thereof. This feature is very desirable because it permits the clip 30 to be clipped onto many different sized parts, even those in constricted locations.

Clip 30 is provided with outstanding ears 34 and 35 between a main portion 40 and arms 39 and 38, respectively. It should be noted that ear 34 is provided with grooves 36, and ear 35 is provided with grooves 37 to improve gripability by the user.

FIG. 6 shows a partial view of a modification of the clips 7 and 30 shown in FIGS. 2 through 5. The clip 42 shown in FIG. 6 has at least one of its integral first and second arms provided with at least one internally-radiating member 43 for selectively and releasably gripping an external object 47, such as a suspended wire between member 43 and the internal periphery 44 of the main portion 45.

The internally-radiating member 43 may be provided with a curved seat portion 46 to facilitate gripping the external object 47 between member 43 and main portion 45.

With reference to FIG. 7, there is shown a tray 50 having a raised portion 52 to which a plurality of color-coded pairs of clips may be selectively and releasably secured and displayed. The tray 50 forms part of the novel kit of components according to the present invention. In accordance with a preferred embodiment of the invention, the raised portion 52 would surround a message portion 53 on the tray 50. The message portion 53 may include any cautionary notices or instructions for the user.

Preferably, in packaging the kit of components according to the present invention, the tray 50 would be arranged with pairs of color-coded clips mounted and displayed along the raised portion 52. The entire assemblage can then be placed in a cardboard or styrofoam container, or alternatively be blister packed.

FIG. 8 shows a novel holder 60 according to the invention having two end pieces 61 and 62 for slidably and removably holding an elongated shaft 63 to which a plurality of color-coded pairs of clips may be selectively and releasably secured and displayed. An optional feature of holder 60 would be rubberized and/or magnetized pads 64 and 65 secured to the bottom of end pieces 61 and 62, respectively. This would permit the holder 60 to be easily secured in a conveniently working position, such as under the hood of an automobile. The holders have openings 66 formed therein for respectively receiving opposite ends of te shaft 63. The openings 66 are sized to permit the holders 61 and 62 to securely and slidingly engage the shaft 63. Also, each holder 61 and 62 has a groove 67 formed in a top surface thereof, the groove being sized to securely grip one end of the shaft 63 so that the shaft can be used in an upstanding position, if desired. The grooves 67 could alternatively be formed as cylindrical or oval recesses.

Optionally, if desired, the color-coded pairs of clips may be arranged along shaft 63 and the entire assemblage blister packed or placed in an appropriate carton to be sold as the kit of components with the instructions and cautionary notice.

The FIG. 9 shows an alternative holder 70 which is provided with an elongated shaft 71 having a cross sectio 72 which matches at least a portion of the shape form between the integral first and second arms of clip 7 when clip 7 is selectively and releasably secured to the elongated shaft 71, so that the plurality of color-coded pairs of clip 7 may be selectively and releasably secured and displayed on the elongated shaft 71.

The holder 70 is provided with a base 73 to which is secured an upright portion 74 affixed to the shaft 71. If desired, the base 73 may be provided with a magnetic and/or rubber pad for convenient mounting.

An optional feature of holder 70 is to provide the portion 74 with triangular-shaped clip-separating elements such as 75 and 76, distributed along the entire length of shaft 71. The purpose of such element 75 and 76 is to permit a pair of color-coded clips to be disposed therebetween, and to separate it from the adjacent pair of color-coded clips. In addition, the element 75 and 76 guide the ends of the clips into appropriate gripping position.

It should be apparent to the artistan the strutures according to the present invention can be used with a stand to hold wires for soldering, and related purposes.

Although there has been described what is at present considered to be the preferred embodiments of the invention, it will be understood that various modifications and variations may be made therein, and it is intended to cover in the appended claims all such modifications as fall within the true spirit and scope of the invention.

I claim:

1. A kit of components, comprising:
   a plurality of one piece unitary, integral, resilient clips;
   said plurality of clips are provided in color coded pairs of said clips so that the color of any particular color coded pair of said clips is different than the color of all the remainder of said color coded pairs of said clips; and a holder for selectively and releasably securing and displaying said clips having an elongated shaft with a cross-section which substantially conforms to the shape of said plurality of clips, said shaft being integral with a base member substantially the length of said shaft.

2. A kit of components according to claim 1, wherein:

each said clip comprises a main portion provided with an integral first arm at a first end thereof and an integral second arm at a second end thereof;

said first and second arms are disposed on opposite sides of a predetermined plane which substantially perpendicularly bisects said clips;

each said clip is adapted to be selectively and releasably secured to an external object when said first and second arms are positioned on substantially opposite sides of said external object so that said clip is held onto said external object by at least one resilient force which acts on said external object in a predetermined direction which is substantially perpendicular to said predetermined plane; and said elongated shaft matches at least a portion of the shape formed between said integral first and second arms of a said clip when a said clip is selectively and releasably secured to said elongated shaft.

3. A kit of components according to claim 1, wherein:
said base member of said holder is provided with a magnetic base.

4. A kit of components according to claim 1, wherein:
said kit is employed to identify parts being assembled or disassembled.

5. A kit of components according to claim 1, wherein:
said holder includes clip separating elements along the length of said elongated shaft.

6. A kit of components, comprising:

a plurality of one piece unitary, integral, resilient clips;

said plurality of clips are provided in color coded pairs of said clips so that the color of any particular color coded pair of said clips is different than the color of all the remainder of said color coded pairs of said clips;

a holder means selectively and releasably securing and displaying said clips having two end pieces for slidably and removably receiving an elongated shaft to which said plurality of color coded pairs of clips are selectively and releasably secured and displayed.

7. A kit of components according to claim 6, wherein:
each said end piece of said holder is provided with a magnetic base.

8. A kit of components according to claim, wherein:

each said clip comprises a main portion provided with an integral first arm at a first end thereof and an integral second arm at a second end thereof;

said first and second arms are disposed on opposite sides of a predetermined plane which substantially perpendicularly bisects said clips;

each said clip is adapted to be selectively and releasably secured to an external object when said first and second arms are positioned on substantially opposite sides of said external object so that said clip is held on to said external object by at least one resilient force which acts on said external object in a predetermined direction which is substantially perpendicular to said predetermined plane; and said elongated shaft matches at least a portion of the shape formed between said integral first and second arms of a said clip when a said clip is selectively and releasably secured to said elongated shaft.

9. A kit of components, comprising:

a plurality of one-piece unitary, integral, resilient clips;

each said clip comprises a one-piece unitary integral main portion provided with an integral first arm at a first end thereof and an integral second arm at a second end thereof:

said plurality of clips are provided in adjacent color coded pairs of said clips so that the color of any particular color coded pair of said clips is different than the color of all the remainder of said color coded pairs of said clips; and said color coded pairs of clips are used to aid in the assembly and disassembly of automobile engines such that one of said pair of color coded clips is used to identify a first part and the other of said pair of color coded clips is used to identify a second part to be mated to said first part so that said first and second parts may easily be put together.

* * * * *

UNITED STATES PATENT AND TRADEMARK OFFICE
CERTIFICATE OF CORRECTION

PATENT NO. : 4,874,084

DATED : Oct. 17, 1989

INVENTOR(S) : Richard A. Strausser

It is certified that error appears in the above-identified patent and that said Letters Patent is hereby corrected as shown below:

Column 1, line 27, after "issued" insert --in--;
        line 67, change "reliant" to --resilient--.
Column 3, line 11, after "with" change "1" to --one--;
        line 13, after "which" change "a" to --are--;
        line 29, change "its" to --at--;
        line 37, after "provided" insert --a--;
        line 42, change "and" to --an--; change "greed" to --green--;
        lines 43-44, delete "For use, a mechanic in disassembling an engine, for example, may of clips 1, a greed pair of clips 1, etc.";
        line 50, change "pairs" to --pair--.
Column 4, line 50, change "groves" to --grooves--;
        line 51, change "users" to --user's--;
        line 57, change "grove" to --groove--.
Column 5, line 18, change "study" to --stud--;
        line 28, change "censor" to --sensor--;
        line 35, change "groved" to --grooved--.

UNITED STATES PATENT AND TRADEMARK OFFICE
CERTIFICATE OF CORRECTION

PATENT NO. : 4,874,084

DATED : Oct. 17, 1989

INVENTOR(S) : Richard A. Strausser

It is certified that error appears in the above-identified patent and that said Letters Patent is hereby corrected as shown below:

```
Column 6, line 15, change "conveniently" to --convenient--;
         line 31, before "FIG. 9" delete "The";
         line 33, change "sectio" to --section--;
         line 34, change "form" to --formed--;
         line 47, change "element" to --elements--;
         line 50, change "element" to --elements--.
Column 8, line 8 (claim 8, line 1), after "claim" insert --6--;
         line 14 (claim 8, line 7), change "clips" to --clip--.

In the Abstract, line 2, change "kits" to --clips--.
```

Signed and Sealed this

Twenty-first Day of May, 1991

*Attest:*

HARRY F. MANBECK, JR.

*Attesting Officer*        *Commissioner of Patents and Trademarks*